United States Patent [19]
Yazaki et al.

[11] 4,015,277
[45] Mar. 29, 1977

[54] SHUTTER DEVICE FOR A CAMERA
[75] Inventors: Mutsunobu Yazaki; Noriaki Sanada, both of Yokohama; Tetsuya Taguchi, Kawasaki, all of Japan
[73] Assignee: Canon Kabushiki Kaisha, Tokyo, Japan
[22] Filed: June 23, 1975
[21] Appl. No.: 589,395
[30] Foreign Application Priority Data
  June 25, 1974   Japan .............................. 49-72655
  Aug. 25, 1974   Japan .............................. 49-96496
[52] U.S. Cl. .............................. 354/206; 354/204; 354/213; 354/246
[51] Int. Cl.² ............................................ G03B 17/42
[58] Field of Search .......... 354/204, 205, 206, 234, 354/235, 245, 246, 202, 212, 213, 251

[56] References Cited
UNITED STATES PATENTS

| 3,715,959 | 2/1973 | Harvey | 354/246 |
| 3,759,156 | 9/1973 | Kobori | 354/206 |
| 3,768,389 | 10/1973 | Ettischer et al. | 354/206 |
| 3,829,877 | 8/1974 | Kitai | 354/246 |
| 3,833,915 | 9/1974 | Tanaka et al. | 354/246 |
| 3,868,708 | 2/1975 | Winkler et al. | 354/206 |
| 3,896,467 | 7/1975 | Hamada | 354/206 |
| 3,906,530 | 9/1975 | Oshima | 354/204 |

Primary Examiner—Russell E. Adams, Jr.
Attorney, Agent, or Firm—Toren, McGeady and Stanger

[57] ABSTRACT

A shutter device for a camera in which the film has frame perforations, is designed so that the operation means is functionally engaged with the film winding up mechanism in such a manner that the operation lever of the operation means moves as one body with the operation means during the shutter charging operation and is kept in a position which is out of engagement with the shutter charge means by a fixed stopping member during the film winding up operation following the shutter charging after the termination of the shutter charging.

3 Claims, 11 Drawing Figures

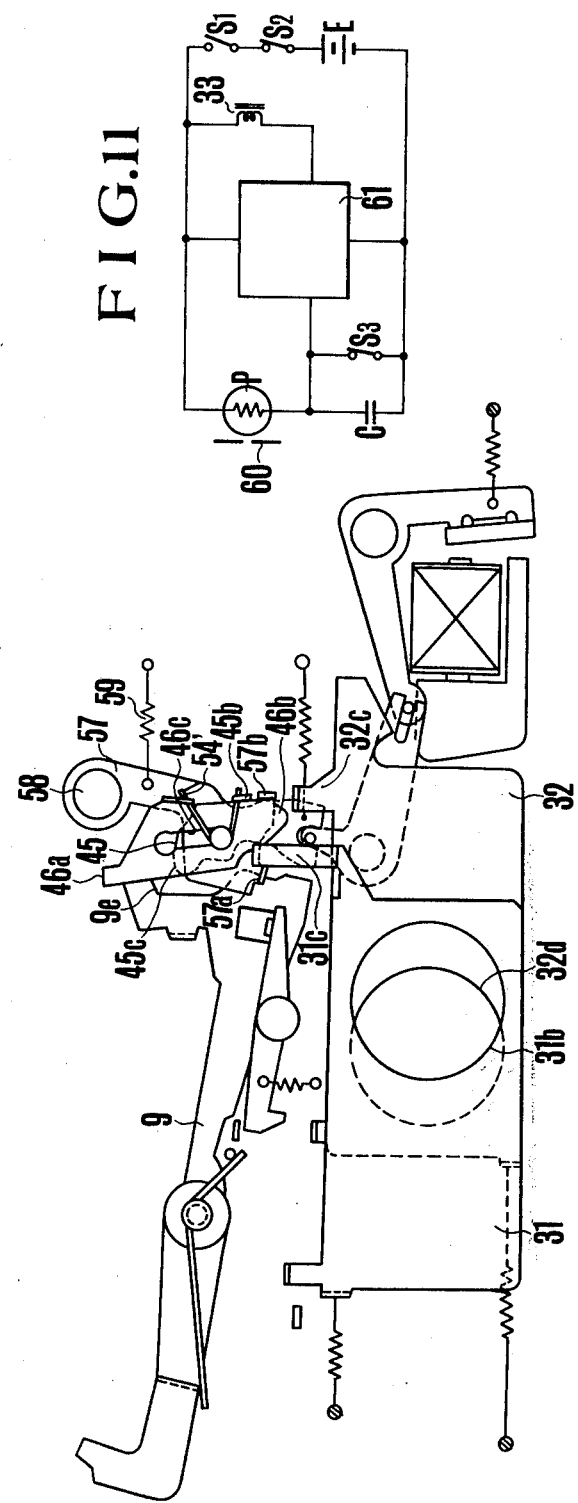

SHUTTER DEVICE FOR A CAMERA

BACKGROUND OF THE INVENTION

1. Field of the Invention

The present invention relates to a shutter for a camera, particularly to an improvement of the shutter for a known camera in which a film known as 110 film and presenting one perforation per frame is used.

2. Description of the Prior Art

In case shutter charging and film winding up are operated at the same time by means of one winding up lever or one winding up nob, the operation for charging the shutter is constant while the operation for winding up film around the spool is reduced as the diameter of the spool is increased during the photographing in such a manner that a difference develops between the two operations. In order to eliminate this difference, a slip mechanism is generally provided between the film winding up shaft and the spool. However, the mechanism becomes complicated in case such a slip mechanism is adopted to the above mentioned type of camera. For this reason, a system which divides the winding up operation into two operations is adopted so as to complete the shutter charging by means of a first operation and then the film winding up by means of a second operation. Such system is complicated in handling, lacking in the speed for picture taking, and which is unprofitable.

SUMMARY OF THE INVENTION

The first purpose of the present invention is to offer a shutter setting device by means of which such shortcoming as mentioned above can be elimimated in such a manner that even in case of a camera in which no slip mechanism is used in the shutter charging and the film winding up can be operated smoothly by means of only one setting operation.

For such a camera as mentioned above, an electrically controlled shutter is often used which is designed so that a slit is formed with the front curtain and the rear curtain for determining the shutter time by means of the interval between both curtains, whereby the front curtain is allowed to run by operating a mechanical disengaging device, while the rear curtain is held by an electromagnetic means, namely a magnet, and is allowed to run after the elapse of a certain determined time by solving the holding of the rear curtain by the magnet; However, in case of this kind of shutter the rear curtain can not always be kept firm because the magnet does not operate properly, when the current source of the magnet circuit has been consumed, the batteries as current source are not loaded, or the magnet circuit is not closed with sureness at the time of releasing, and therefore, it often happens that the front curtain and the rear curtain start to run at the same time without forming any slit between the front curtain and the rear curtain so that the film is not exposed at all.

The second purpose of the present invention is to offer a novel shutter device by means of which the shortcoming of the conventional device mentioned above can be eliminated and characterized in that the operation state of the electromagnet means at the time of releasing the shutter is detected in such a manner that in case the electromagnet means is not in the operating state the closing operation of the shutter is delayed for a certain determined time.

BRIEF DESCRIPTION OF THE DRAWINGS

Below the present invention will be explained in detail in accordance with the accompanying drawings of the embodiment of the present invention.

FIG. 5 shows the state in which the shutter has been charged.

FIG. 6 shows the state in which the shutter is opened by releasing the shutter.

FIG. 7 shows the state in which the exposure has been finished.

FIG. 8 shows the state in which, at releasing the shutter, the mechanical shutter control means is in operation while the electromagnet means is out of operation.

FIGS. 9 and 10 respectively show the composition of the important parts of another embodiment of the shutter device in accordance with the present invention, whereby, FIG. 9 shows the state in which at the time of releasing the shutter the shutter closing means is kept by means of the mechanical shutter control means while the electromagnetic means is out of operation.

FIG. 10 shows the state in which the connection with the opening operation of the shutter the stopping operation for the shutter closing means by means of the above mentioned mechanical shutter control means is released so as to allow the above mentioned shutter closing means to start to run.

FIG. 11 shows a circuit diagram of an embodiment of the shutter control circuit applicable to the above mentioned embodiments.

DETAILED DESCRIPTION OF THE INVENTION

Figure 1:
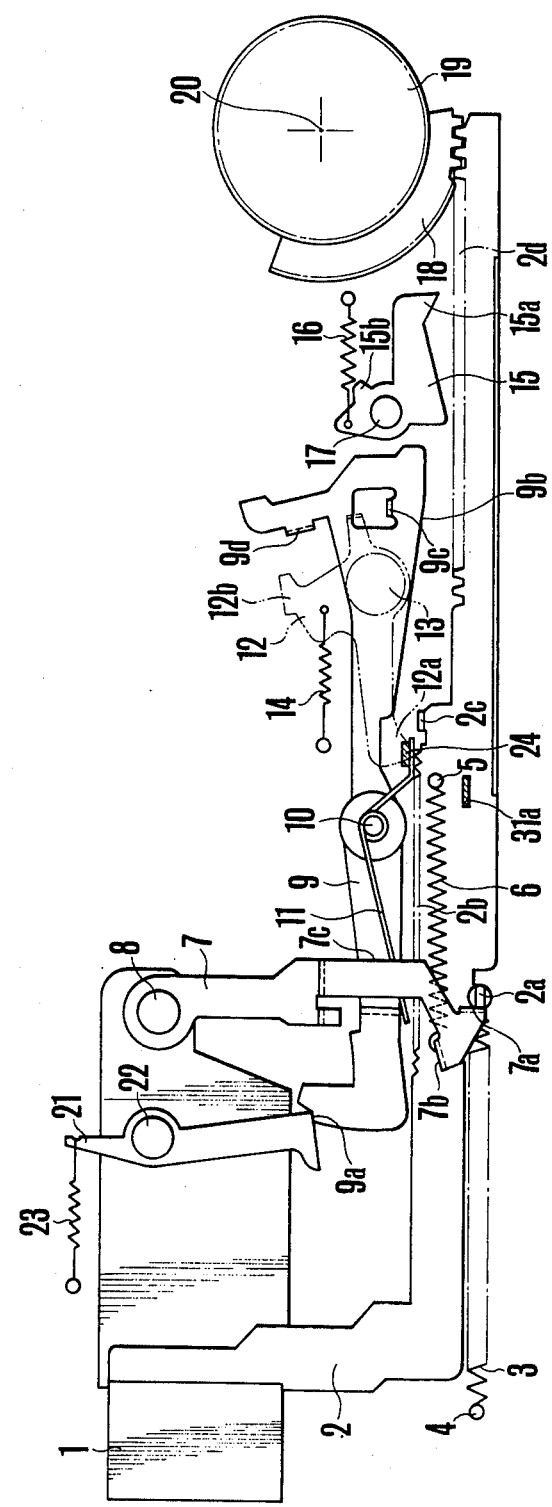
FIG. 1 shows a plane view of the shutter setting device ready for taking a photograph.

In the drawings, 1 is the set operation plate, 2 the set plate making one body with the set operation plate and being guided by means of a conventional method so as to be slidable along the lengthwise direction of the camera. 3 is a return spring provided between the rising up part 2a of the set plate and a pin 4 provided on a fixed part of the camera. 7 is an operation lever pivoted on the set operation plate 1 by means of a shaft 8 and biased by means of a spring 6 extending between its second rising up part 7b and a pin 5 provided on the set plate so as to be combined with the set plate 2 as one body while its first rising up part 7a engages with the above mentioned rising up part 2a. 9 is a release bar rotatably pivoted on a fixed part of the camera by means of a shaft and forced clockwise by means of the spring 11 in such a manner that its end 9a is kept at one end of a stopping lever 21 when the shutter has been set. The stopping lever 21 is pivoted on a fixed part of the camera by means of a shaft 22, so as not to interfere with the set operation plate 1 and is usually forced counterclockwise by means of the spring 23. 18 is a segment gear engaged with a rack 2d of the set plate 2 and rotatably provided on a shaft 20 coaxially with the film winding up gear 19, so as to convey exclusively the counterclockwise rotation to the gear by means of a one way clutch not shown in the drawing. The gear 20 is functionally engaged with the film winding up spool, not shown in the drawing, by means of a conventional method. 12 is a strip claw presenting an end 12a in engagement with a ratchet gear 2b formed on the set plate 2 and a hook 12b in engagement with the bent part 9d of the release bar and pivoted on a fixed part of the camera by means of the shaft 13 in such a manner that the end 12a is forced by means of the spring 14 in the direction along which the end 12a engages with the ratchet gear. 15 is a return prevention claw for preventing the set plate from returning whereby the claw 15 presents a claw part 15a and a hook part 15b, and is rotatably pivoted on a shaft 17 and is forced clockwise by means of the spring 16.

Figure 5:
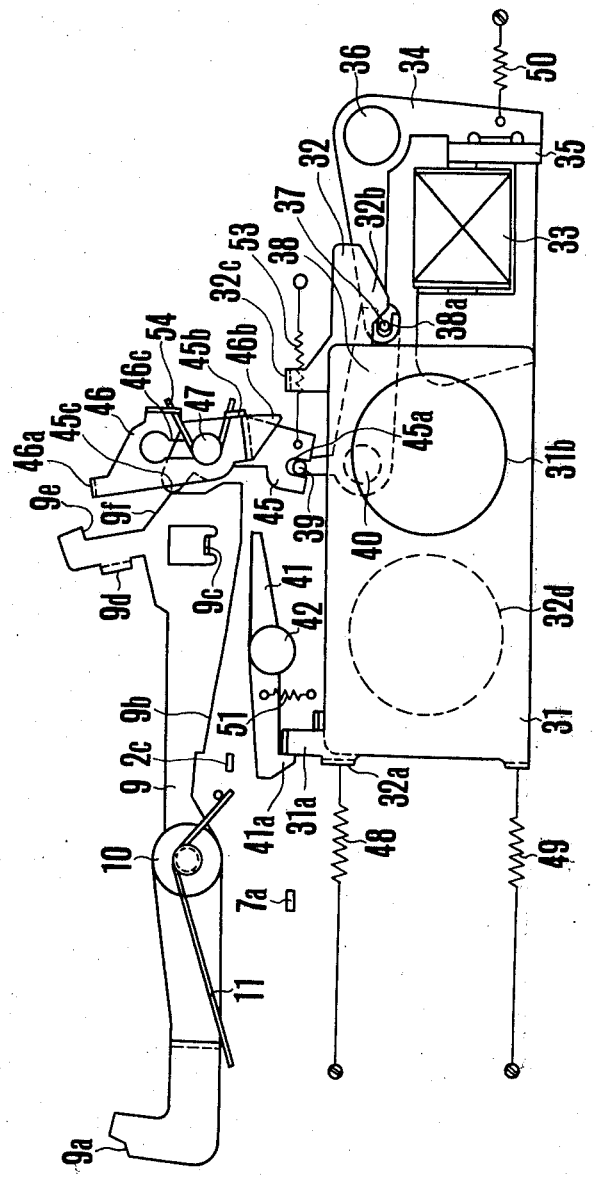
FIGS. 5 to 8 respectively show the composition of the important parts of an embodiment of the shutter device in accordance with the present invention, whereby.
Figure 6:
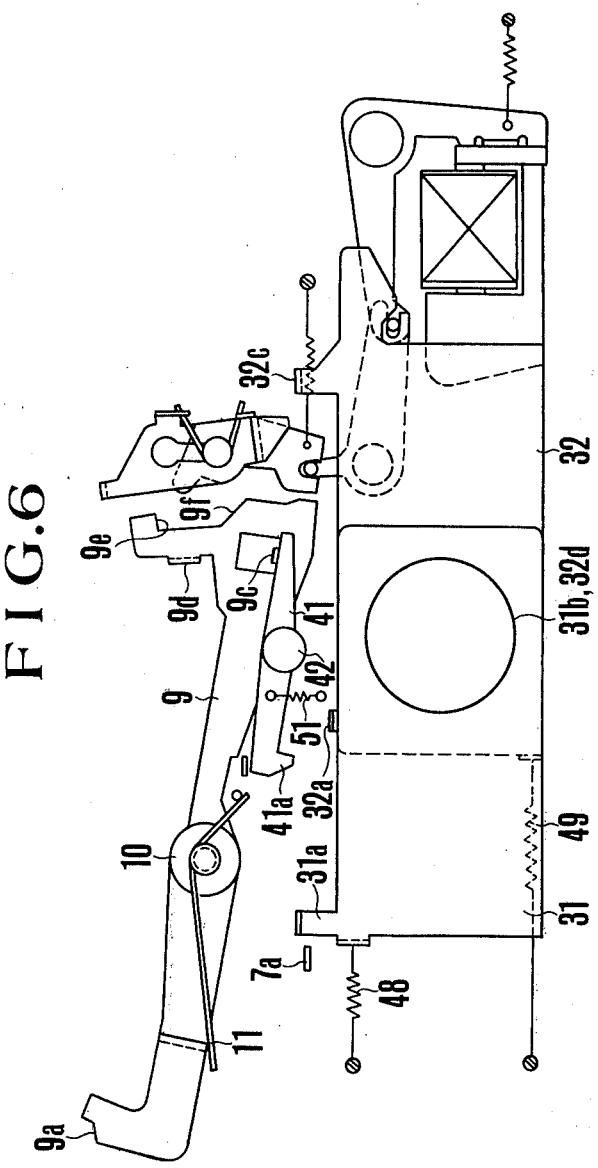

In FIG. 5, 31 is the front shutter curtain having a projection 31a and an opening 31b, it is biased to the left in the drawing by means of a spring 48 for actuating the front curtain 31. When the shutter has been charged, the above mentioned projection is kept at the position shown in the drawing, being engaged with a hook part 41a on the front plane tensioning lever 41. 42 is the rotary shaft of the lever 41, and 51 the spring for forcing the lever 41 counterclockwise. The spring 6 is supposed to be stronger than the shutter driving spring (to be explained later). 32 is the rear shutter curtain providing shutter closing means and presenting bent pieces 32a, 32c, and engaging claw 32b and an opening 32d. The gear starter curtain is forced to the left in the drawing by means of the rear curtain actuating spring 49 so as to stop the bent piece 32a at the projection 31a of the front curtain 31. 33 is the magnet is a electromagnet means, an 34 is a lever for holding the armature 35 of the magnet 33. The lever is rotatably pivoted on the shaft 36 and forced by means of the spring 50 in the direction in which the armature 33 is separated from the magnet 35 and one of its arms has a pin 37 in engagement with the engaging claw 32b of the rear plane, providing a stop for the rear curtain. 38 is an intermediate lever, whose one end presents a engaging groove 38a for the pin 37 of the holding lever 34 of the armature and whose other arm presents a pin 39, whereby the lever 38 is rotatably pivoted by means of the shaft 40. 45 is a detecting means for detecting the operation state of the magnet 33, namely a detecting lever presenting an engaging groove 45a for engaging the pin 39 of the above mentioned intermediate lever 38, the bent part 45b and the projection 45c capable of the detecting lever 45 are engaging with the cam face 9b of the above mentioned release bar 9, whereby the detecting lever 45 is rotatably pivoted on a shaft 47 and forced by the spring 53 in the direction along which the above mentioned projection 45c engages with the cam face 9f of the above mentioned release bar 9. 46 is a mechanical shutter control means, namely a stopping lever presenting a bent piece 46a capable of engaging with the projection 9e of the above mentioned release bar 9, a projection 46b capable of engaging with the bent piece 32c of the rear curtain 32 and a groove 46c in which the shaft 47 is fitted so that as to make the stopping lever 46 is movable upwards and downwards. Further the stopping lever 46 is forced by means of the spring 54 positioned between the lever 46 and the stopping lever 46, for counterclockwise around the shaft. Accordingly the bent part 45b of the detecting lever 45 is in contact with the one end face of the stopping lever 46. 24 is a stopping member fixed in the path of the operation lever 7, with the stopping member 24 engaging with the operation lever 7, when the shutter charge has been completed.

FIG. 11 shows an embodiment of the shutter control circuit applicable to the embodiment of the present invention. In the drawing, P is a light sensing element, and the amount of the light sensed by the element is varied by means of a manually adjustable diaphragm 60. C is a condensor for controlling the shutter time by means of a CR time constant circuit consisting of the condensor C and the light sensing element P. 61 is the switching circuit for the magnet 33, $S_1$ is the current source switch functionally engaged with a release button, not shown in the drawing, $S_2$ is a switch to be opened when a flash light device is mounted on the camera for taking photographs using a flash light, $S_3$ a switch for starting the time counting and E is the current source of the circuit.

The operation of the above described device is explained in detail below.

Figure 2:
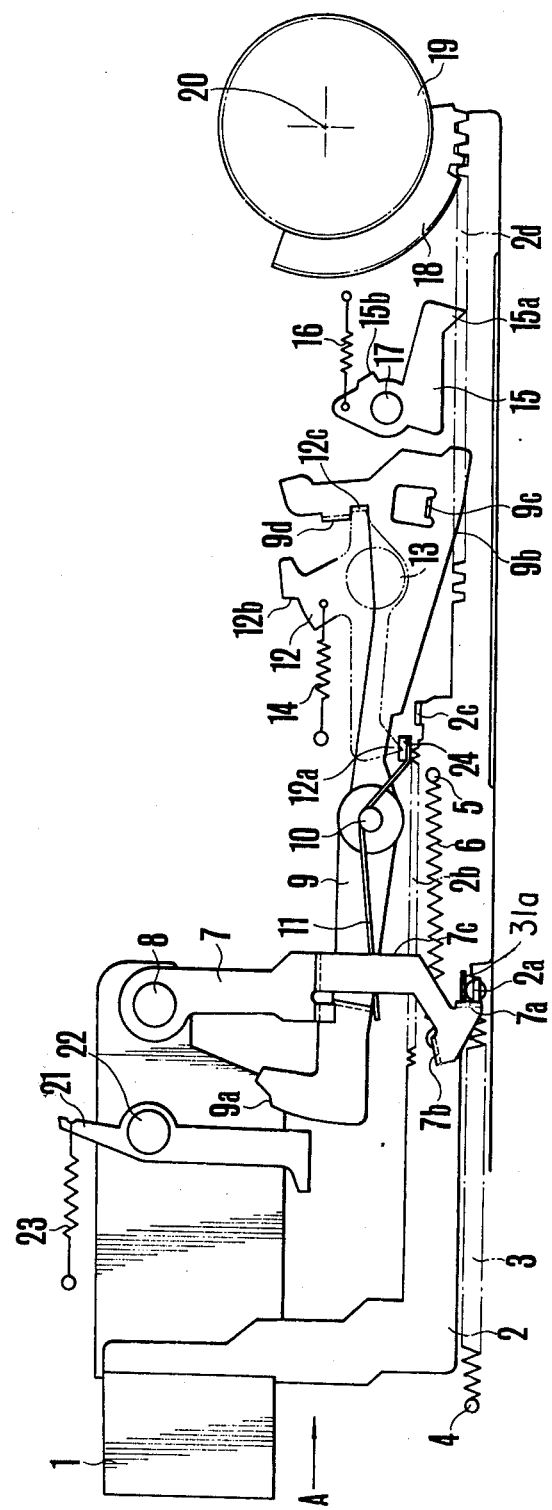
FIG. 2 shows also a plane view of the shutter setting device after finishing the taking of a photograph.

If the release button, not shown in the drawing, is operated when the camera is in the state shown in FIGS. 1 and 5 with the winding up operation such as film winding up and the shutter charging completed, at first the current source switch $S_1$ in the circuit shown in FIG. 11 is closed, namely the circuit is closed for supplying current to the magnet 33 which attracts the armature 35. When the release button is pushed further the stopping lever 21 is rotated clockwise and releases the end 9a of the release lever 9, whereby the release lever 9 is rotated clockwise by means of the effect of the spring 11 in such a manner that the rising up part 9c of the release lever 9 pushes the front plate tensioning lever 4, so as to release the stopping action. Thus the front shutter curtain starts to run to the left to start exposure. At this time, following the rotation of the release lever 9, the detecting lever 45 has the tendency to rotate counterclockwise along the cam face 9f due to the effect of the spring 53, however, because the armature 35 is attracted by means of the magnet 33, the detecting lever 45 is prevented from rotating by means of the armature holding lever 34 and the intermediate lever 38. At the end of the rotation of the release lever 9, its bent or rising-up part 9c engages with the end of the front plate tensioning lever 41, so as to rotate the front plate tensioning lever 41 clockwise and disengaging the hook part 41a of the front plate tensioning lever 41 from the projection 31a of the front curtain 31 in such a manner that the front curtain 31 starts to run to the left in FIG. 1 under the biasing effect of the spring 48. At this time, the rear curtain 32 is held by the engagement of the claw 32b by the pin 37 provided on the armature holding lever 34. When the front curtain 31 starts to run, the opeing 31b of the front curtain 31 and the opening 32d of the rear curtain 32 lie over each other so as to form an exposure opening, whereby the film not shown in the drawing is exposed. When the counting of the determined shutter time by means of the CR-time constant circuit in the control circuit shown in FIG. 11 is completed, the switching circuit 61 operates, to interrupt the current supply to the magnet 33, whereby the magnet 33 releases the armature 35. Because the armature holding lever 34 is rotated counterclockwise by means of the effect of the spring 50, the engaging claw 32b of the rear curtain 32 becomes disengaged from the pin 37 provided on the lever 34 the rear curtain 32 starts to run due to the effect of the spring 49 for closing the exposure opening, thereby terminating the exposure. Because at this time in connection with the armature holding lever 32 the intermediate lever 38 and the detecting lever 45 are rotated, the stopping lever 46 also rotates, however, since the projection 46b of the stopping lever 46 is out of the path of the bent piece 32c of the rear curtain 32, there is no influence on the movement of rear curtain. Upon further rotation of the release lever 9, the bent part 9d pushes the arm 12c of the stopping claw 12, rotating the stopping claw 12 clockwise against the force of the spring 13 until the end 12a escapes from the ratchet tooth 2b, while the bent part 9d releases the lock of the return prevention claw 15 by means of an intermediate member, not shown, so as to enable the next setting operation, whereby the operation for taking a photograph is completed. Accordingly, FIG. 2 shows this state of the camera. When in the state shown in FIG. 2, the set operation plate 1 is pushed to slide the set plate 2 in the the direction of the arrow A, the operation lever 7 pivoted on the set plate 2 is also slide as one body in such a manner that the rising up part 7a pushes the engaging part 31a of the front shutter curtain 31, so as to translate the front shutter curtain and the rear shutter curtain, while the shutter driving springs 48, 49 are or tensioned.

Accompanied with the rotation of the release lever 13, the detecting lever 45 is rotated clockwise by the spring 53, becomes its projection 45c contacts the cam face 9f, until the detecting lever 45 reaches a certain predetermined position.

Figure 3:
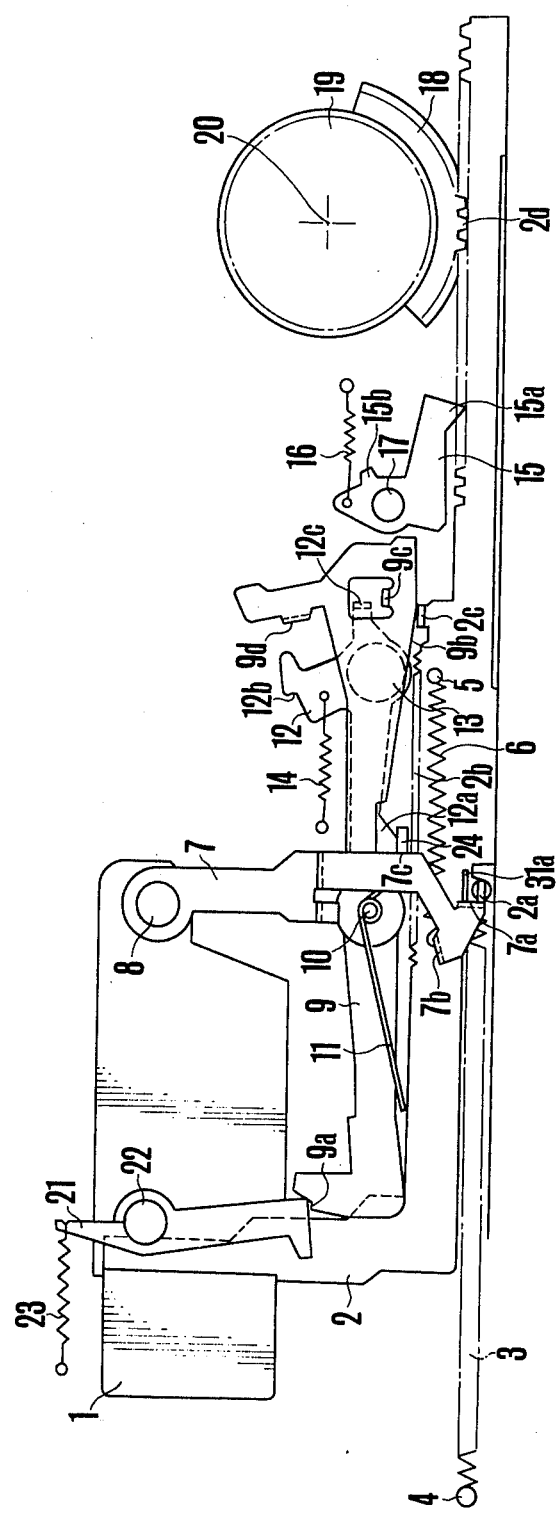
FIG. 3 shows also a plane view of the shutter setting device after it has been charged.
Figure 4:
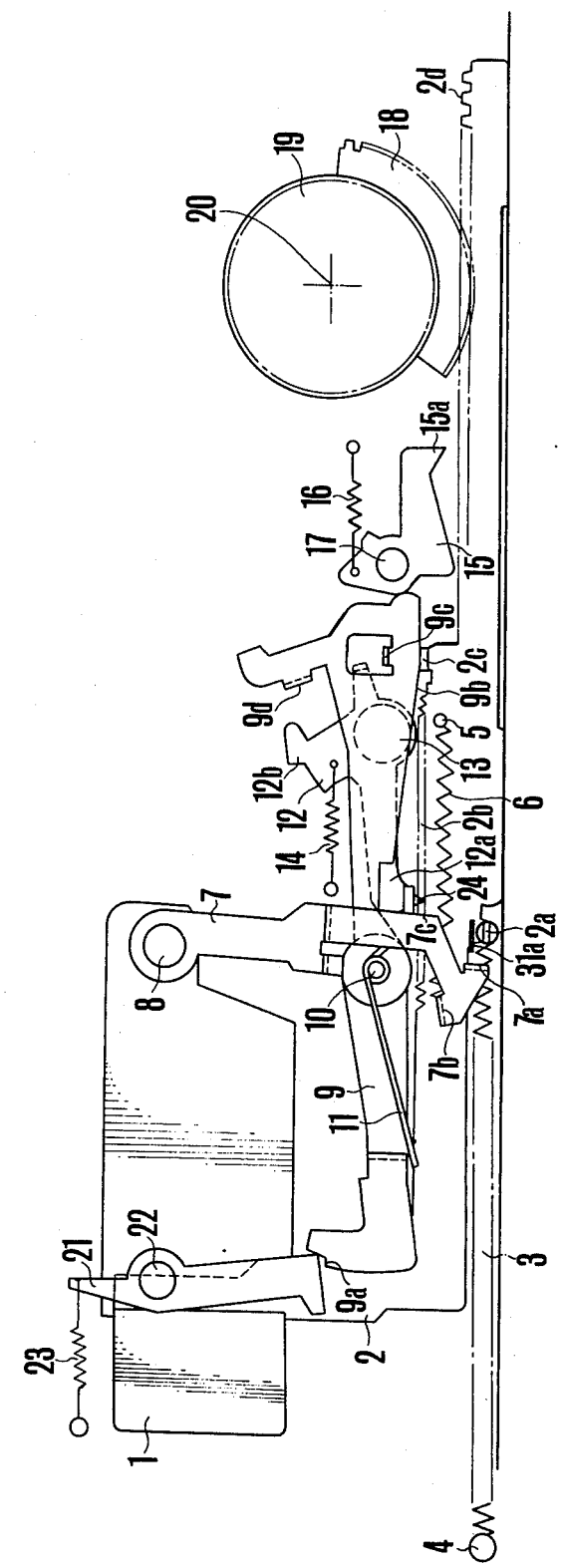
FIG. 4 shows also a plane view of the shutter setting device when the film has been wound up.

Accompanying the rotation of the detecting lever 45, the stopping lever 46 is rotated clockwise as one body, while the intermediate lever 38 is rotated counterclockwise due to the engagement of the pin 39 in the engaging groove 45a. By the counterclockwise rotation of the intermediate lever 38 the armature holding lever 34 is rotated clockwise around the shaft 36 as center against the force of the spring 50 by means of the engaging groove 38a and the pin 37, so that the armature 35 is pressed against the magnet 33. Further the rack 2d of the set plate rotates the segment gear 18 counterclockwise, so as to wind up the film around the winding up spool not shown in the drawing. On the other hand, the rising up part 2c of the set plate 2 engages with the cam part 9b of the side edge of the release lever 9, so as to rotate the release lever 9 counterclockwise around the shaft 10 as center against the force of the spring 11 and to engage the hook 9a with the end of the stopping lever 21. When the side edge 7c of the operation lever 7 reaches the position at which it engages the stopping member 24 as is shown in FIG. 3, the shutter has been charged whereby the front shutter curtain is stopped by means of the front shutter curtain tensioning lever 41. At this point, the film has not yet been wound up for one picture, accordingly, the film winding up operation continues by means of the rack 2d, as the set plate is pushed further, whereby because the operation lever 7 is stopped by means of the stopping member, the operation lever 7 rotates around the contact point with the stopping member 24 as support point against the force of the spring 6 in accordance with the movement of the pivot 8 whereby the end 7a is separated from the projection 31a on the front shutter curtain, so that there is no influence exerted upon the shutter. Further, at this time, the cam part 9b of the lever 9 becomes parallel to the slide direction of the set plate so that the release lever 9 is not rotated any more. When the film has been wound up for one picture while the set plate 2 is moved further, the locking of the stopping claw 12 is released from functional engagement with the operation of for example, from the perforation detecting lever not shown in the drawing, in such a manner that the end 12a engages with the ratchet 2b of the set plate, so as to stop the movement of the set plate. In functional engagement herewith the return prevention claw 15 is rotated until it is locked at the position at which the claw does not engage with the rack 2d so as to enter into the state as is shown in FIG. 4, so that when the operation plate 1 is released the set plate 2 returns to the left under the effect of the return spring 3 for returning the camera to the state shown in FIG. 1, whereby it is ready for taking a photograph.

As explained above, in accordance with the present invention, on the set member is a swing member combined with it by means of a spring provided in such a manner that after the shutter member is moved by a certain determined amount by means of the above mentioned swing member, so as to complete the shutter charge operation, the swing member is made to escape from the shutter charge member by means of the stopping member during the film feeding operation so that it is possible to obtain a set device capable of shutter charging and the film winding up at the same time by means of a remarkably simple operation. Further, even after the shutter has been charged the spring of the swing member is loaded on the set member in place of the shutter driving spring, so that during the operation of the set member the load is not varied abruptly so as to be able to obtain a smooth operation.

Figure 7:
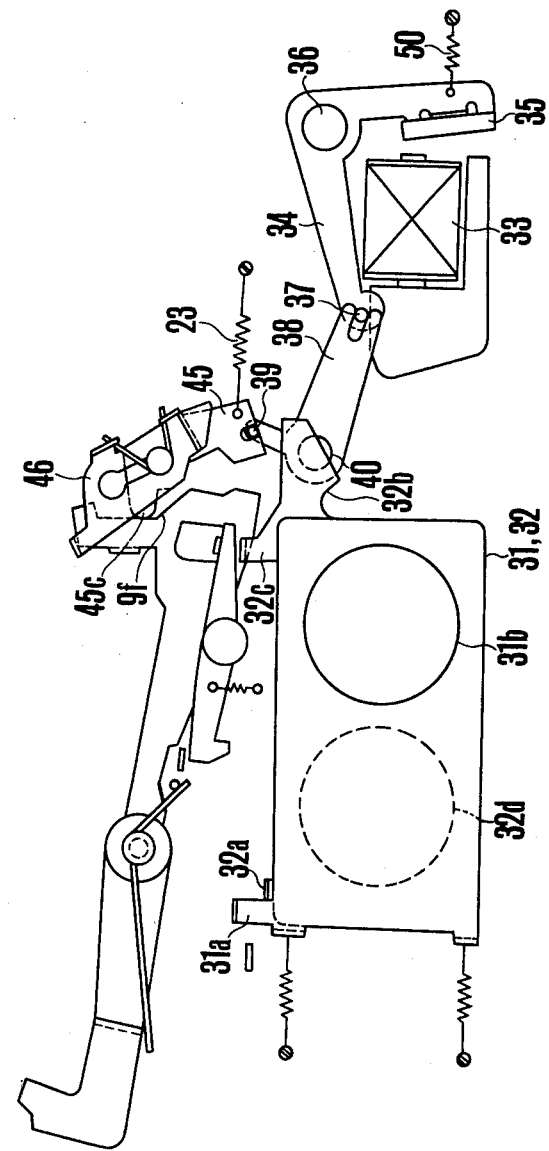

The following description refers to the case when the magnet 33 does not operate at the time of shutter release. In case no current is supplied to the magnet 33 even when the release button, not shown in the drawing, is operated for closing the current source switch $S_1$ shown in FIG. 7, the armature 35 is freed from the magnet 33, and the detecting lever 15 is in a position to rotate counterclockwise by means the effect of the spring 53 (and 50). (However, because at this time the release lever is not released, the detecting lever 45 is prevented from going further by the projection 45c contacting the cam face 9f of the release lever 9.) In consequence, when by operating the release button the release lever 9 is freed and the lever 9 rotates clockwise under the influence of the spring 52, the cam face 9f is also translated so that the detecting lever 45 is rotated counterclockwise along the cam face 9f. At this time, the stopping lever 46 is rotated counterclockwise as one body with the detecting lever 45 until the lever 46 is brought into the path of the projection 9e on the release lever 9. Further, as the detecting lever 45 rotates the intermediate lever 38 is rotated clockwise so that the armature holding lever 34 is rotated counterclockwise by means of the effect of the spring 50 in such a manner that the pin 37 is disengaged from the engaging claw 32b of the rear curtain. By further operation of the release lever 9, the projection 9e of the release lever 9 engages with the bent piece 46d of the stopping lever 46, whereby the release lever 9 pushes the stopping lever 46 which is guided by the shaft 47 and against the force of the spring 54 so that the stopping lever 46 is slid along the direction of the arrow B in FIG. 8. As a result, the projection 46b is set in the position in the path of of the bent piece 32c of the rear plane 32. When at the end of the rotation of the release lever 9, the tension of the front curtain is released as explained above, the front curtain 31 starts to run.

Figure 8:
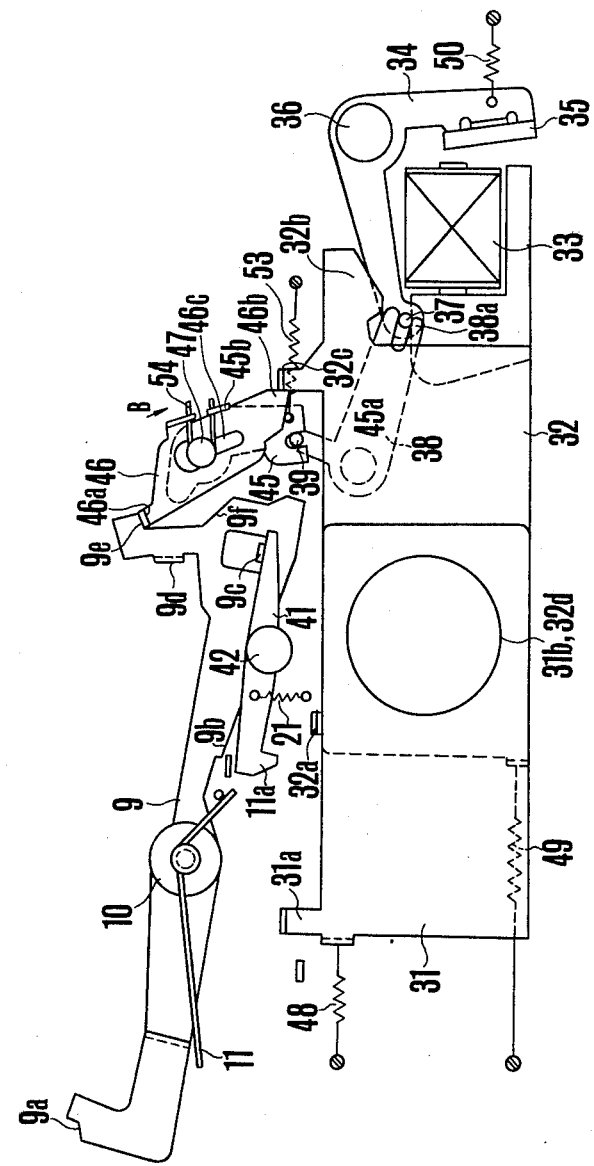

Because at this time, the engaging claw 32b of the rear curtain 32 is disengaged from the pin 37 as explained above, the rear curtain 32 is about to start running along with the front plane 31, however the projection 46b of the stopping lever 46 is situated in the path course of the bent piece 32c so that rear curtain 32 is prevented from starting to run, being engaged with the projection 46b. The above mentioned state is shown in FIG. 8. Because of the difference between the force of the rear curtain driving spring 49 and that of the spring 54 the stopping lever 46 is gradually rotated clockwise, the projection 46b being pushed by the bent piece 32c of the rear plane until the bent piece 46a disengages from the projection 9e of the release lever 9. Thus the stopping lever 46 slides in the direction opposite to the arrow B by means of the effect of the spring 54 in such a manner that the projection 46b is brought out of the path of the bent piece 32c of the rear curtain 32, and the rear curtain 32 starts to run so as to complete the exposure.

The present embodiment is designed so that in the event the magnet 33 does not operate by means of the difference between the force of the spring 49 and that of the spring 54 the start of the curtain is delayed by a certain determined time, for obtaining the determined exposure time. Apart from above it can also be designed so that the start of the rear curtain is delayed by a certain determined time, for example, by applying a delay device to the stopping lever. Therefore, it is posssible to set an optional fixed exposure time by means of changing the strength of the above mentioned springs.

Figure 9:
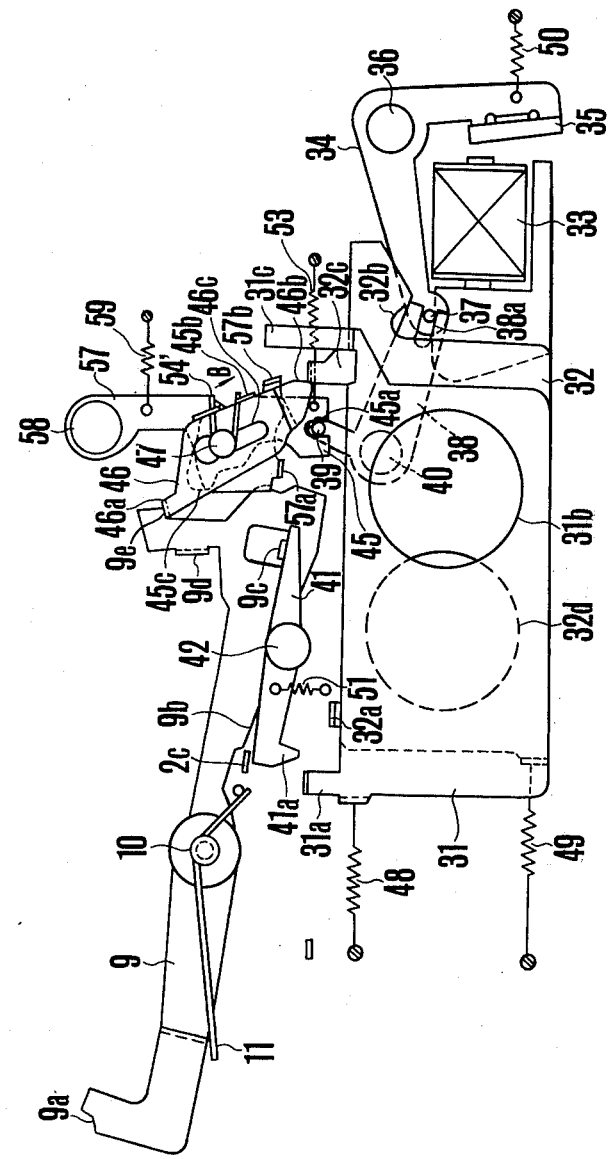

An other embodiment will now be explained in detail. FIG. 9 and FIG. 10 respectively show the composition of the an important component of still another embodiment. In case of is present embodiment, the camera is designed that in the event the magnet does not operate, the above mentioned mechanical shutter control means stop the shutter closing member fixedly, while the stopping operation is released in functional engagement with the opening operation of the shutter. The compositions and the effect of the members presenting the same reference numerals as in FIGS. 1 to 8 act in the same manner. 31c is the bent piece provided on the front shutter curtain, 54' the spring corresponding to the spring 54 in the aforementioned embodiment whereby in the present embodiment the effect of the spring 54' is designed so as to be stronger than that of the rear curtain driving spring 49. Thus, contrary to the aforementioned embodiment, the stopping lever 46 acts to stop the rear plane completely. 57 is the releasing means for releasing the stopping operation of the stopping lever 46 in functional engagement with the motion of the front curtain 31, namely the releasing means presenting the bent piece 57a, 57b, and being forced to rotate counterclockwise around the shaft 58 in the drawing by means of the effect of the spring 59. The bent piece 31c of the front curtain 31 is capable of engaging with the bent piece 57a, while the end face of the stopping lever 46 is capable of engaging with the bent piece 57b. Therefore, as the shutter control circuit shown in FIG. 11 can be used as in the case of the aforementioned embodiment.

The following is a description of the operation of the above-described device. The operation whereat the time of releasing the shutter the magnet 33 works normally is almost same as that of the aforementioned embodiment so that the explanation of such operation is omitted. Because the bent piece 31c of the front curtain 31 is brought in contact with the bent piece 57a in functional engagement with the motion of the front curtain, the releasing lever 57 is rotated clockwise against the force of the spring 59 so that the stopping lever 46 is also rotated but counterclockwise by means of the bent piece 57b of the releasing lever 57 whereby in the event the magnet 33 works normally the projection 46b of the stopping lever 46 is out of the path course of the bent piece 32c of the rear curtain 32 from the beginning so that there is no influence upon the motion of the rear curtain 32.

The following is an explanation of the case where at the time of releasing the shutter, the magnet 33 does not operate. If the release button not shown in the drawing, is operated so as to close the current source switch in the circuit in FIG. 11 and no current is supplied to the magnet 33, the armature 35 is freed from the magnet 33, so that, similarly to the case of the aforementioned embodiment the detecting lever 45 is rotated counterclockwise following the cam face 9f of the release lever 9 when the release lever 9 is released so as to be rotatable clockwise. Thus similar to the case of the aforementioned embodiment the bent piece 46a of the stopping lever 46 is brought into the path of the projection of the release lever 9 (and further at this time accompanied with the detecting lever 45 the pin 37 provided on the armature holding lever 34 disengages from the engaging claw 32b of the rear curtain 32, as explained in accordance with the aforementioned embodiment), so that the bent piece 46a of the stopping lever 46 is pushed by the further rotation of the release lever 9, whereby the stopping lever 46, guided by the shaft 47, slide against the force of the spring 54' in the direction of the arrow B in FIG. 9 in such a manner that the projection 46b is brought into the path of the bent piece 32c of the rear curtain. At the end of the rotation of the release lever 9, the front curtain is released as explained in accordance with the case of the aforementioned embodiment so that the front curtain 31 starts to run. On the other hand, at this time the bent piece 32c of the rear curtain 32 engages with the projection 46b of the stopping lever 46, however, the force of the spring 54' is greater than that of the rear curtain driving spring 49, as explained above, so that the rear curtain 32 is firmly stopped by means of the stopping lever 46. The above mentioned state is shown in FIG. 9.

At the start of the front curtain 31 the exposure start to take place, however, the front curtain 31 continues to run until the bent piece 31c of the front plane 31 is brought into contact with the bent piece 57a of the release lever 57, when the release lever 57 is rotated around the shaft 58 clockwise against the force of the spring 59 in such a manner that the stopping lever 46 is rotated around the shaft 47 clockwise, its end face being pushed by means of the bent piece 57b of the releasing lever 57 so that the bent piece 46a disengages from the projection 9e of the release lever 9. Thus by means of the effect of the spring 54 , the stopping lever 46 is slid along th direction opposite to the arrow B in FIG. 9 so that the projection 46b disengages from the bent piece 32c of the rear curtain and the rear curtain 32 starts to run. This state is shown in FIG. 10.

In the event the magnet 33 does not work, in connection with the running of the front curtain 31, the rear curtain 32 is released to obtain a certain determined exposure time, whereby the difference between the running starts of both planes, namely the exposure time is determined by the position at which the bent piece 31c of the front curtain 31 is set so that it is possible to set an optional fixed exposure time by changing the set position of the bent pieces 31c. If for example, the bent piece 31 is set at the position at which the bent piece 31 releases the stopped rear curtain at the end of the movement of the front curtain 31, the shutter for its full extent.

Hereby the charging in the present embodiment is carried out similarly to the aforementioned embodiment.

When at the time of taking a photograph using a flash light, a flash light device, not shown in the drawing, is mounted on the camera, and the switch $S_2$ in the circuit in FIG. 11 is opened so that the magnet 33 does not work at the time of releasing shutter in such a manner that the shutter time is set at the shutter time proper to the device as is explained in accordance with the operation of the aforementioned two embodiments. As a consequence, if the fixed exposure time proper to the above mentioned device is set at a certain shutter time suited for taking a photograph using flash light from the beginning, it becomes possible to obtain the shutter time suitable for taking a photograph under flash light by simply mounting the flash light device on the camera.

As explained above in case of the shutter device in accordance with the present invention, whether the electromagnetic means is in the normal operation state or not is detected by the detecting means for determining the operation state of the electromagnetic means for controlling the closing operation of the shutter at the time of releasing the shutter in such a manner that in case the electromagnetic means does not operate normally the mechanical shutter control means is operated so as to mechanically delay the shutter closing operation by a certain determined time so that even when the electromagnetic means does not work due to the consumption of the battery, the misloading of the battery or the disorder of the circuit, the shutter automatically operates with a certain determined shutter time whereby there is no fear that the exposure opening should not be formed because the electromagnetic means does not work and the film should not be exposed. The present invention can be said to offer a remarkably profitable shutter device.

Further, if a switch means which is opened when at the time of taking photographs with a flash light device, is mounted on the camera and is connected with the magnet circuit as is shown in the embodiment (FIG. 11), the magnet is brought out of operation simply by mounting the flash light device on the camera and the shutter operates with a certain determined shutter time proper to the device so in case the shutter is set at a certain time suitable for taking a photograph with a flash light, at the time of taking the photograph with the flash light not only the operation for shutter time setting can be eliminated but also the current source for the shutter control circuit can be economized, which is quite profitable.

What is claimed is:

1. A shutter charging device for a camera using a film providing one perforation per one frame, comprising a shutter including a shutter driving spring, a film winding mechanism, means for charging said shutter driving spring, operation means operatively engageable with said means for charging said shutter driving spring and said film winding mechanism for effecting at the same time the operation of said film winding mechanism and the charging of said shutter driving spring, said operation means including a set plate movably displaceable through an operating stroke, an operation lever movably mounted on said set plate, said operation lever having a part engageable with said means for charging said shutter driving spring, a spring extending between and connected to said set plate and said operation lever so that said operation lever is moved by said set plate during the operating stroke thereof and engages with said means for charging said shutter driving spring for effecting the charging of said shutter driving spring, a fixed stopping member located in the path of said operation lever for engagement therewith after said set plate completes a predetermined portion of the operating stroke so that said stopping member disengages said operation lever from said means for charging said shutter driving spring while said said plate continues the remainder of the operating stroke for completing the film winding operation.

2. A shutter charging device, as set forth in claim 1, wherein said shutter driving spring comprises a first driving spring and a second driving spring, said shutter comprises a front shutter curtain connected to said first driving spring and a rear curtain connected to said second driving spring, means for releasing said front shutter curtain for displacement in response to said first driving spring, means for holding said rear shutter curtain against the action of said second driving spring, said means for holding said rear shutter curtain includes an electromagnetic means, a circuit means for controlling said electromagnetic means, a current source means for said circuit means, means for detecting the operational state of said electromagnetic means, and means for mechanically delaying the closing operation of said rear shutter curtain when said detecting means determines that said electromagnetic means is out of its operational state.

3. A shutter charging device, as set forth in claim 2, including a control means in operative engagement with said front shutter curtain, said control means operatively connected to said delay means for controlling the operation of said delay means.

* * * * *

UNITED STATES PATENT OFFICE
CERTIFICATE OF CORRECTION

Patent No. 4,015,277          Dated March 29, 1977

Inventor(s) Mutsunobu Yazaki et al

It is certified that error appears in the above-identified patent and that said Letters Patent are hereby corrected as shown below:

In the heading of the patent [30] should read as follows:

--[30]  Foreign Application Priority Data

June 25, 1974     Japan...........49-72655
August 22,1974    Japan...........49-96496--.

Signed and Sealed this

Twenty-fourth Day of May 1977

[SEAL]

Attest:

RUTH C. MASON
*Attesting Officer*

C. MARSHALL DANN
*Commissioner of Patents and Trademarks*